(12) United States Patent
Jaju

(10) Patent No.: US 11,995,974 B2
(45) Date of Patent: May 28, 2024

(54) LAWFUL INTERCEPT (LI) FOR VEHICLES USING CAMERAS INSTALLED/MOUNTED ON CONNECTED AND/OR AUTONOMOUS VEHICLES USING THEIR ANY G (2G/3G/4G/5G) CONNECTIVITY

(71) Applicant: Parallel Wireless, Inc., Nashua, NH (US)

(72) Inventor: Ganesh Jaju, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 17/356,875

(22) Filed: Jun. 24, 2021

(65) Prior Publication Data
US 2022/0358831 A1 Nov. 10, 2022

(51) Int. Cl.
G08B 25/01 (2006.01)
G06T 7/246 (2017.01)
G08B 25/10 (2006.01)
H04W 4/029 (2018.01)

(52) U.S. Cl.
CPC ............ *G08B 25/014* (2013.01); *G06T 7/246* (2017.01); *G08B 25/10* (2013.01); *H04W 4/029* (2018.02); *G06T 2207/30252* (2013.01)

(58) Field of Classification Search
CPC .................. G08B 25/014; H04W 4/029; G06T 2207/30252
See application file for complete search history.

(56) References Cited

U.S. PATENT DOCUMENTS 9,135,816 B2 * 9/2015 Chung .................... G08G 1/052
9,551,591 B2 * 1/2017 Bodake ................ G01C 21/367
10,212,535 B2 2/2019 Mishra et al.
10,327,185 B2 6/2019 Agarwal et al.
10,687,192 B2 6/2020 Raje et al.
10,755,111 B2 * 8/2020 Golov ..................... G06V 20/63
2018/0018869 A1 * 1/2018 Ahmad ................. G06V 20/63
2020/0242922 A1 * 7/2020 Dulberg ................. G08G 1/012
2021/0321225 A1 * 10/2021 Vanderveen .......... H04W 4/029

OTHER PUBLICATIONS

Universal Mobile Telecommunications System (Umts); LTE; 5G; 3GPP Evolved Packet System (EPS); Evolved General Packet Radio Service (GPRS) Tunnelling Protocol for Control plane (GTPv2-C); Stage 3 (3GPP TS 29.274 version 16.5.0 Release 16).
Digital cellular telecommunications system (Phase 2+) (GSM); Universal Mobile Telecommunications System (UMTS); LTE; 5G; Numbering, addressing and identification (3GPP TS 23.003 version 16.3.0 Release 16).

* cited by examiner

*Primary Examiner* — John A Tweel, Jr.
(74) *Attorney, Agent, or Firm* — Michael Y. Saji; David W. Rouille

(57) ABSTRACT

Methods are disclosed for providing Lawful Intercept (LI) for vehicles. In one embodiment the method includes providing, to at least one autonomous vehicle, at least one vehicle number of a vehicle being tracked and using a camera of the at least one autonomous vehicle, determining a vehicle number of the a vehicle the autonomous vehicle has encountered. The method further includes comparing the vehicle number of the vehicle the autonomous vehicle encountered to the vehicle number of the vehicle being tracked, and when the vehicle number of the vehicle the autonomous vehicle encountered matches the vehicle number of the vehicle being tracked, sending a message to law enforcement that the vehicle being tracked has been encountered.

12 Claims, 3 Drawing Sheets

LAWFUL INTERCEPT (LI) FOR VEHICLES USING CAMERAS INSTALLED/MOUNTED ON CONNECTED AND/OR AUTONOMOUS VEHICLES USING THEIR ANY G (2G/3G/4G/5G) CONNECTIVITY

CROSS-REFERENCE TO RELATED APPLICATIONS

This application claims priority under 35 U.S.C. § 119(b) to India Pat. App. No. 202111020543, filed May 5, 2021, titled "Lawful Intercept (LI) for Vehicles Using Cameras Installed/Mounted on Connected and/or Autonomous Vehicles Using Their any G (2G/3G/4G/5G) Connectivity" which is hereby incorporated by reference in its entirety for all purposes. The present application hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purpose. This application also hereby incorporates by reference in their entirety each of the following U.S. Pat. applications or Pat. App. Publications: US20150098387A1 (PWS-71731US01); US20170055186A1 (PWS-71815US01); US20170273134A1 (PWS-71850US01); US20170272330A1 (PWS-71850US02); and Ser. No. 15/713,584 (PWS-71850US03).

BACKGROUND

The following 3G specifications are referenced herein. While 3G is described, it should be understood that the following description applies to all G radio technologies, including but not limited to 2G, 3G, 4G and 5G.
  3GPP Specification 29.274
  3rd Generation Partnership Project;
  Technical Specification Group Core Network and Terminals;
  3GPP Evolved Packet System (EPS);
  Evolved General Packet Radio Service (GPRS)
  Tunnelling Protocol for Control plane (GTPv2-C);
  3GPP Specification 24.008
  3rd Generation Partnership Project;
  Technical Specification Group Core Network and Terminals;
  Mobile radio interface Layer 3 specification;
  Core network protocols;

SUMMARY

A system is disclosed to identify a mechanism to implement a Lawful Intercept (LI) interface for vehicle numbers leveraging the cameras and any G (2G/3G/4G/5G) connectivity infrastructure of the autonomous and/or connected vehicles.

In one embodiment a method for providing lawful intercept includes providing, to at least one autonomous vehicle, at least one vehicle number of a vehicle being tracked and using a camera of the at least one autonomous vehicle, determining a vehicle number of a vehicle the autonomous vehicle has encountered. The method further includes comparing the vehicle number of the vehicle the autonomous vehicle encountered to the vehicle number of the vehicle being tracked, and when the vehicle number of the vehicle the autonomous vehicle encountered matches the vehicle number of the vehicle being tracked, sending a message to law enforcement that the vehicle being tracked has been encountered.

DETAILED DESCRIPTION

Figure 1:
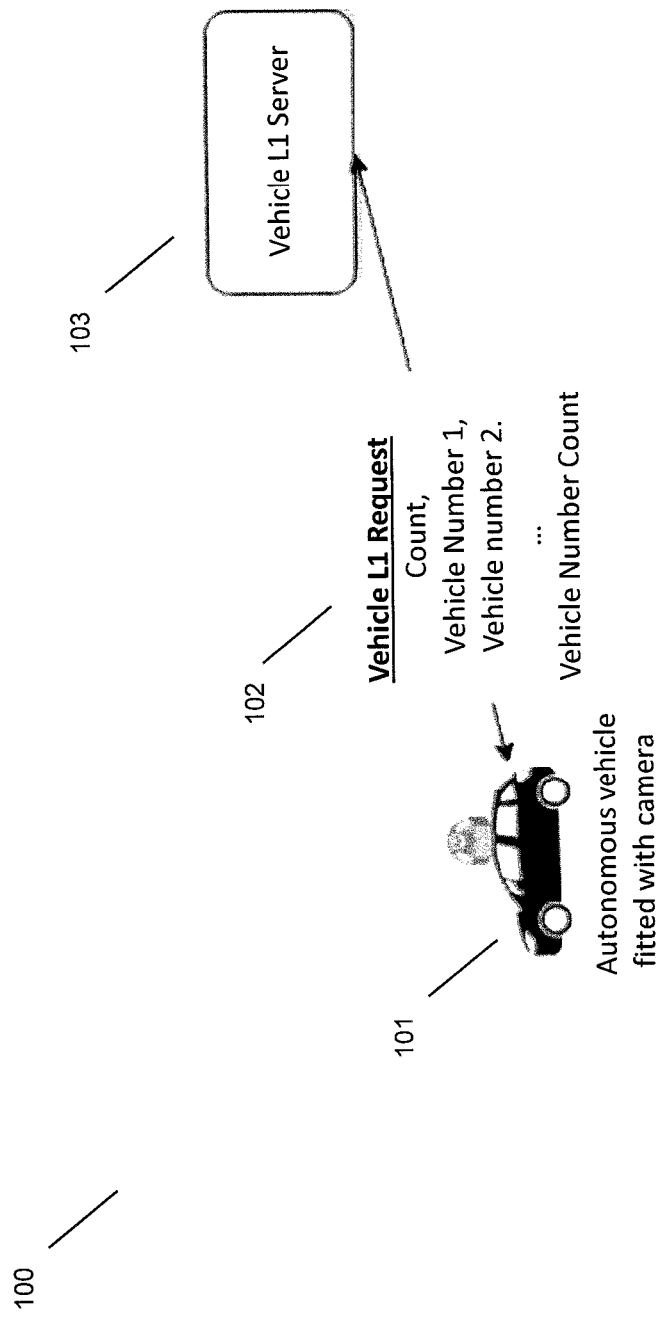
FIG. 1 is a block diagram showing a system for providing legal intercept, in accordance with some embodiments.

Methods are described for providing Lawful Intercept (LI) of vehicles. User Location Information (ULI) is an extendable IE that is coded. The CGI, SAI, RAI, TAI, ECGI and LAI identity types are defined in 3GPP TS 23.003.

The ULI IE shall contain only one identity of the same type (e.g. more than one CGI cannot be included), but ULI IE may contain more than one identity of a different type (e.g. ECGI and TAI). The flags LAI, ECGI, TAI, RAI, SAI, CGI and Macro eNodeB ID in octet 5 indicate if the corresponding type shall be present in a respective field or not. If one of these flags is set to "0", the corresponding field shall not be present at all. If more than one identity of different type is present, then they shall be sorted in the following order: CGI, SAI, RAI, TAI, ECGI, LAI, Macro eNodeB ID.

The following subclauses specify the coding of the fields representing different identities.

For each identity, if an Administration decides to include only two digits in the MNC, then "MNC digit 3" field of corresponding location shall be coded as "1111".

UE Time Zone

UE Time Zone is used to indicate the offset between universal time and local time in steps of 15 minutes of where the UE currently resides. The "Time Zone" field uses the same format as the "Time Zone" IE in 3GPP TS 24.008 [5].

UE Time Zone is coded as this. The value of the Time Zone field represents the time zone adjusted for daylight saving time. The value of the Daylight Saving Time field specifies the adjustment that has been made.

The spare bits indicate unused bits, which shall be set to 0 by the sending side and which shall not be evaluated by the receiving side.

Possible values for the "Daylight Saving Time" field and their meanings are shown in Table 1.

TABLE 1

| Daylight Saving Time | Value (binary) | |
|---|---|---|
| | Bit 2 | Bit 1 |
| No adjustment for Daylight Saving Time | 0 | 0 |
| +1 hour adjustment for Daylight Saving Time | 0 | 1 |
| +2 hours adjustment for Daylight Saving Time | 1 | 0 |
| Spare | 1 | 1 |

Time Zone

The purpose of this information element is to encode the offset between universal time and local time in steps of 15 minutes.

The Time Zone information element is coded as shown in table 2 and table 3

TABLE 2

| 8 | 7 | 6 | 5 | 4 | 3 | 2 | 1 | |
|---|---|---|---|---|---|---|---|---|
| | | | Time Zone |E| | | | | | octet 1 |
| | | | Time Zone | | | | | octet 2 |

TABLE 3

Time Zone (octet 2, bits 1-8)
This field uses the same format as the Timezone field used in the TP-Service-Centre-Time-Stamp, which is defined in 3GPP TS 23.040 [90], and its value shall be set as defined in 3GPP TS 22.042 [89]

The Time Zone is a type 3 information element with a length of 2 octets.

Time Zone and Time

The purpose of the time zone part of this information element is to encode the offset between universal time and local time in steps of 15 minutes.

The purpose of the time part of this information element is to encode the universal time at which this information element may have been sent by the network.

The Time Zone and Time information element is coded as shown in Table 3 and Table 4. The Time Zone and Time is a type 3 information element with a length of 8 octets.

TABLE 4

Year (octet 2. bits 1-8)
This field uses the same format as the Year field used in the TP-Service-Centre-Time-Stamp, which is defined in 3GPP TS 23.040 [90], and its value shall be set as defined in 3GPP TS 22.042 [89]
Month (octet 3, bits 1-8)
This field uses the same format as the Month field used in the TP-Service-Centre-Time-Stamp, which is defined in 3GPP TS 23.040 [90], and its value shall be set as defined in 3GPP TS 22.042 [89].
Day (octet 4, bits 1-8)
This field uses the same format as the Day field used in the TP-Service-Centre-Time-Stamp, which is defined in 3GPP TS 23.040 [90], and its value shall be set as defined in 3GPP TS 22.042 [89].
Hour (octet 5, bits 1-8)
This field uses the same format as the Hour field used in the TP-Service-Centre-Time-Stamp, which is defined in 3GPP TS 23.040 [90], and its value shall be set as defined in 3GPP TS 22.042 [89].
Minute (octet 6, bits 1-8)
This field uses the same format as the Minute field used in the TP-Service-Centre-Time-Stamp, which is defined in 3GPP TS 23.040 [90], and its value shall be set as defined in 3GPP TS 22.042 [89].
Second (octet 7, bits 1-8)
This field uses the same format as the Second field used in the TP-Service-Centre-Time-Stamp, which is defined in 3GPP TS 23.040 [90], and its value shall be set as defined in 3GPP TS 22.042 [89].
Time Zone (octet 8, bits 1-8)

TABLE 4-continued

This field uses the same format as the Time Zone field used in the TP-Service-Centre-Time-Stamp, which is defined in 3GPP TS 23.040 [90], and its value shall be set as defined in 3GPP TS 22.042 [89].

Currently available methods for law enforcement agencies to track a vehicle have following problems: some of these tracking methods, like chasing the vehicles, require physical efforts using a direct line of sight which is not easy to have and maintain in terrains like in hilly regions, crowded places, etc.

Some of these methods require a GPS to be installed in the vehicle which the officials have access to. This is optional and so not all vehicles might have it installed. Some of the GPS tracking devices have their individual battery which if not charged may be of no use. Most GPS tracking devices make use of some SIM card to send the signal back to the server. Based on the coverage of the operator of SIM, the GPS device might not be able to inform location always. GPS tracking might not work under tunnel due to coverage issues.

Without either of the above options, relying on just the vehicle number and physical description to track the vehicle is a very difficult alternative.

The location trail of a vehicle cannot be derived easily unless it is fitted with a GPS device which stores the location history which also can be easily erased physically.

A solution to above problems is to have a Lawful Intercept (LI) defined for vehicles. Similar to Lawful Intercept for mobile numbers (UEs), the government or relevant law enforcement authority can provide the vehicle number(s) to be tracked. Since connected and/or autonomous vehicles already use the camera for obstacle detection, they can in background process and derive the vehicle number they cross paths with on a low priority and match it against the list of vehicles being tracked. If matched, they can inform the LI Server of the whereabouts of the vehicle using the LI APIs providing the vehicle number, location and time spotted. Such an invention has numerous applications like tracking a vehicle in regions where stationary spy/security cameras are not installed. Tracking is enabled for an out-of-control vehicle or a vehicle with criminal intent in regions with none or limited aerial surveillance. Tracking a vehicle just from the vehicle number is now augmented with an additional set of autonomous and/or connected vehicles working as security/spy cameras for the law enforcement.

With this approach even the vehicles not having any GPS devices on them can be tracked by a connected/autonomous vehicle having mounted/installed cameras.

Such LI updates from multiple locations can help create a location trail for the vehicle being tracked in a way like what RANs do for the UEs helping to know where all the vehicle have moved through.

The details of the architecture and APIs are listed below:
Each country can have their own LI servers.
Whenever any law enforcement agency of same or different country requests for tracking a vehicle and is approved, the LI server can be fed with a vehicle number to be tracked. The LI server broadcasts the vehicle numbers to be tracked to all connected/autonomous vehicles.

Using Broadcast

It is contemplated to use a connected vehicle specific server that handles messages across the individual connected vehicles (applicable to cases where the vehicles communicate only with the server which broadcasts any messages to all connected vehicles).

All the connected and/or autonomous vehicles with a camera whenever they come across a vehicle, run a low priority action item to detect the vehicle number and run it against the list supplied by the LI server. If not matched, no further action is needed.

But if the vehicle number matches, this autonomous/connected vehicle sends a msg to the LI server (either directly or via the connected vehicle server) with following information: vehicle number spotted, location where the vehicle was spotted and time when the vehicle was spotted Application Programming Interfaces (APIs)
Information Messages are sent over UDP protocol using destination port 21000. Each of the parameters of the following APIs are in TLV format with type (one byte) and length (two bytes). Vehicle number are 128 bytes of character string and are specific to country/region. Count is 2 bytes long which indicates the maximum number of vehicle numbers the LI server can ask to be tracked.

Vehicle LI server is always expected to send the entire list which will simply be replaced at the concerned vehicle. "Vehicle LI Inform" will inform only one vehicle at a time as the probability of multiple vehicles to be tracked found next to each other is less. And, even if there are, they can be informed separately one after another. Whenever a vehicle number matching the "Vehicle LI List" is found, the connected/autonomous vehicle informs the LI server directly (or via the connected vehicle server). If connectivity is not there, it would retry for 3 times whenever connectivity is available before giving up.

Details
Vehicle LI Request
Count (No of vehicle numbers to be monitored in this request)
Vehicle Number-1 (128 bytes character string)
Vehicle Number-2 (128 bytes character string)
Additional vehicle-specific character strings from 2 . . . Count-1, so as to include a total number of Count vehicle numbers in this vehicle LI request
Vehicle Number-Count (128 bytes character string)
Vehicle LI Inform
Vehicle Number-X (128 bytes character string)
Location—It can be sent in either of the following two ways
GPS coordinates—Latitude, Longitude.
ULI IE (from 3GPP Spec 29.274)
Time—It can be sent in either of the following two ways
UTC
Time & Time zone IE (from 3GPP Spec 24.008)

FIG. 1 is an architecture diagram of an exemplary system 100 used to provide lawful intercept wherein vehicle numbers 102 have been forwarded from a vehicle 101 to a vehicle LI server 103.

Figure 2:
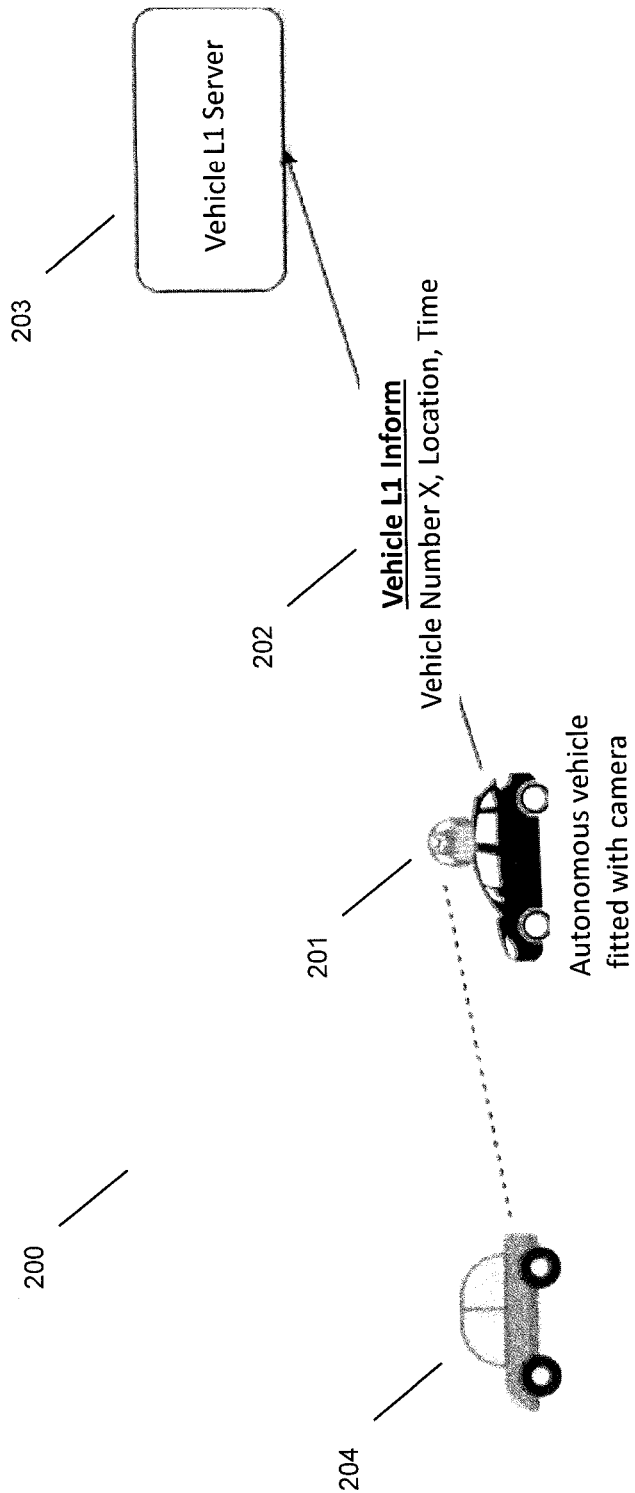
FIG. 2 is a block diagram showing a system for providing legal intercept and a vehicle being tracked, in accordance with some embodiments.

FIG. 2 is an architecture diagram of an exemplary system 200 used to provide lawful intercept wherein a vehicle 201 has encountered a vehicle 204 matching the vehicle number and forwards information 202 to the vehicle LI server 203 including information for tracking the vehicle.

The LI server can be fed with a vehicle number to be tracked. The LI server broadcasts the vehicle numbers to be tracked to all connected/autonomous vehicles. LI updates from multiple locations can help create a location trail for the vehicle being tracked in a way like what RANs do for the UEs helping to know where all the vehicle have moved through.

Figure 3:
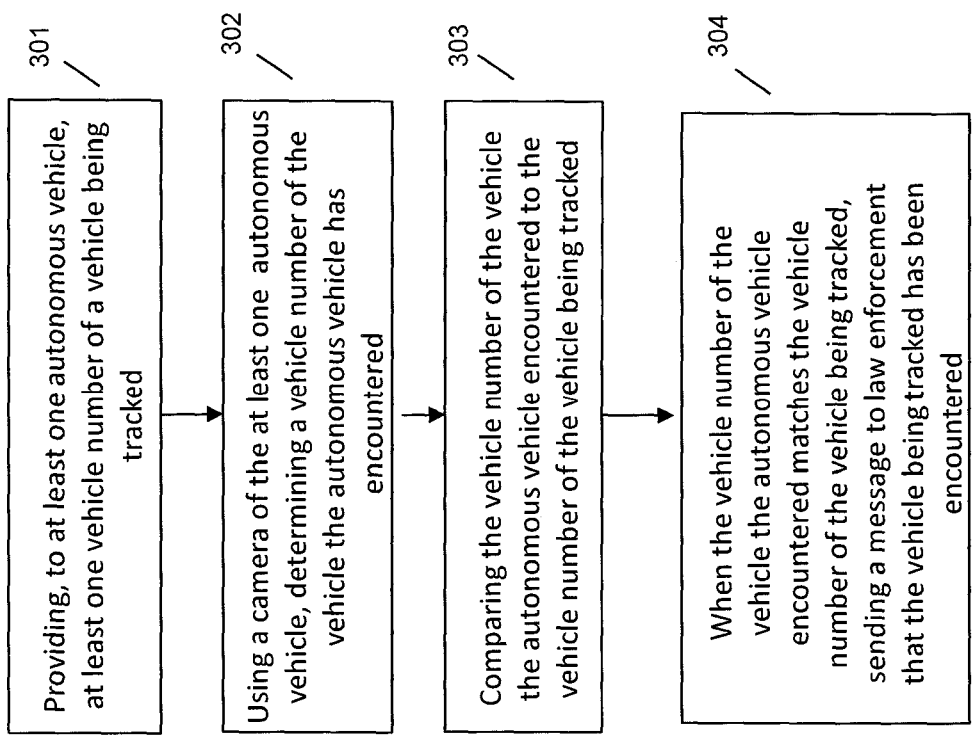
FIG. 3 is a flow diagram showing a method for providing legal intercept in accordance with some embodiments.

Since connected and/or autonomous vehicles already use one or more cameras for obstacle detection, they can in background process and derive the vehicle number they cross paths with on a low priority and match it against the list of vehicles being tracked. Alternately or in combination, other types of vehicle cameras can be used, for example dashboard cameras or backup cameras Referring to FIG. 3, a flow diagram 300 of one embodiment for providing lawful intercept is shown. Method 300 begins with processing block 301 which shows providing, to at least one autonomous vehicle, at least one vehicle number of a vehicle being tracked. The LI server provides this information to at least one autonomous vehicle by way of wireless communication with the autonomous vehicle. The autonomous vehicle can include one or more cameras.

Processing block 302 discloses using a camera of the at least one autonomous vehicle, determining a vehicle number of the vehicle the autonomous vehicle has encountered. This is typically in the form of a license plate or other identifying indicia of a vehicle being searched for.

Processing block 303 shows comparing the vehicle number of the vehicle the autonomous vehicle encountered and captured on its camera to the vehicle number of the vehicle being tracked.

As shown in processing block 304, when the vehicle number of the vehicle the autonomous vehicle encountered matches the vehicle number of the vehicle being tracked, the LI server sends a message to law enforcement that the vehicle being tracked has been encountered. Additional information, including but not limited to, location, direction, or speed of the vehicle may also be provided to law enforcement.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for providing Lawful Intercept (LI) for vehicles, the method comprising:
   providing, to a lawful intercept (LI) server in a telecommunications network, a listing of at least one vehicle number of a vehicle being tracked;
   receiving, at least one autonomous vehicle, the listing of the at least one vehicle number;
   determining, with a camera of the at least one autonomous vehicle, a vehicle number of a vehicle encountered by the autonomous vehicle;
   comparing, at the at least one autonomous vehicle, the vehicle number of the vehicle encountered by the autonomous vehicle to the listing of the at least one vehicle number of the vehicle being tracked; and
   reporting, when the vehicle number of the vehicle encountered by the autonomous vehicle matches the vehicle number of the vehicle being tracked, an indication of the location of the vehicle being tracked,
   wherein reporting the location of the vehicle being tracked further comprises providing a User Location Information (ULI) Information Element (IE) corresponding to a base station where the vehicle being tracked was encountered by the autonomous vehicle, and wherein the ULI is configured to include at least one of an EUTRAN cell global identifier (ECGI), a cell global identifier (CGI), a service area identifier (SAI), a routing area identifier (RAI), a tracking area identifier (TAI), and a location area identifier (LAI).

2. The method of claim 1, wherein using a camera of the autonomous vehicle comprises using a camera of the autonomous vehicle typically used for obstacle detection.

3. The method of claim 1 wherein the providing at least one vehicle number comprises providing a count of vehicles being tracked and a vehicle number of each vehicle being tracked.

4. The method of claim 1 further comprising sending a message reporting the vehicle number.

5. The method of claim 1 further comprising providing GPS coordinates where the vehicle being tracked was encountered by the autonomous vehicle.

6. The method of claim 1 wherein reporting a location comprises providing a time when the vehicle being tracked was encountered by the autonomous vehicle.

7. The method of claim 6 wherein providing a time when the vehicle being tracked was encountered by the autonomous vehicle includes providing a time zone and time Information Element (IE).

8. The method of claim 1 further comprising creating a location trail for the vehicle being tracked from multiple encounters by at least one autonomous vehicle with the vehicle being tracked.

9. The method of claim 1 further comprising using one or more of 2G, 3G, 4G, and 5G connectivity infrastructure of the autonomous vehicle.

10. The method of claim 1 wherein the providing at least one vehicle number comprises providing at least one of a license plate number and other indicia associated with the vehicle.

11. The method of claim 1, further comprising sending a message to law enforcement that the vehicle being tracked has been encountered and further comprising sending at least one of a vehicle speed, location and direction.

12. A method for providing Lawful Intercept (LI) for vehicles, the method comprising:
   providing, to a lawful intercept (LI) server in a telecommunications network, a listing of at least one vehicle number of a vehicle being tracked;
   receiving, at least one autonomous vehicle, the listing of the at least one vehicle number;
   determining, with a camera of the at least one autonomous vehicle, a vehicle number of a vehicle encountered by the autonomous vehicle;
   comparing, at the at least one autonomous vehicle, the vehicle number of the vehicle encountered by the autonomous vehicle to the listing of the at least one vehicle number of the vehicle being tracked; and
   reporting, when the vehicle number of the vehicle encountered by the autonomous vehicle matches the vehicle number of the vehicle being tracked, an indication of the location of the vehicle being tracked,
   wherein reporting the location of the vehicle being tracked further comprises providing a User Location Information (ULI) Information Element (IE) corresponding to a base station where the vehicle being tracked was encountered by the autonomous vehicle.

* * * * *